March 6, 1962 E. C. CINNIRELLA 3,023,779
FLUID FLOW CONTROL VALVE

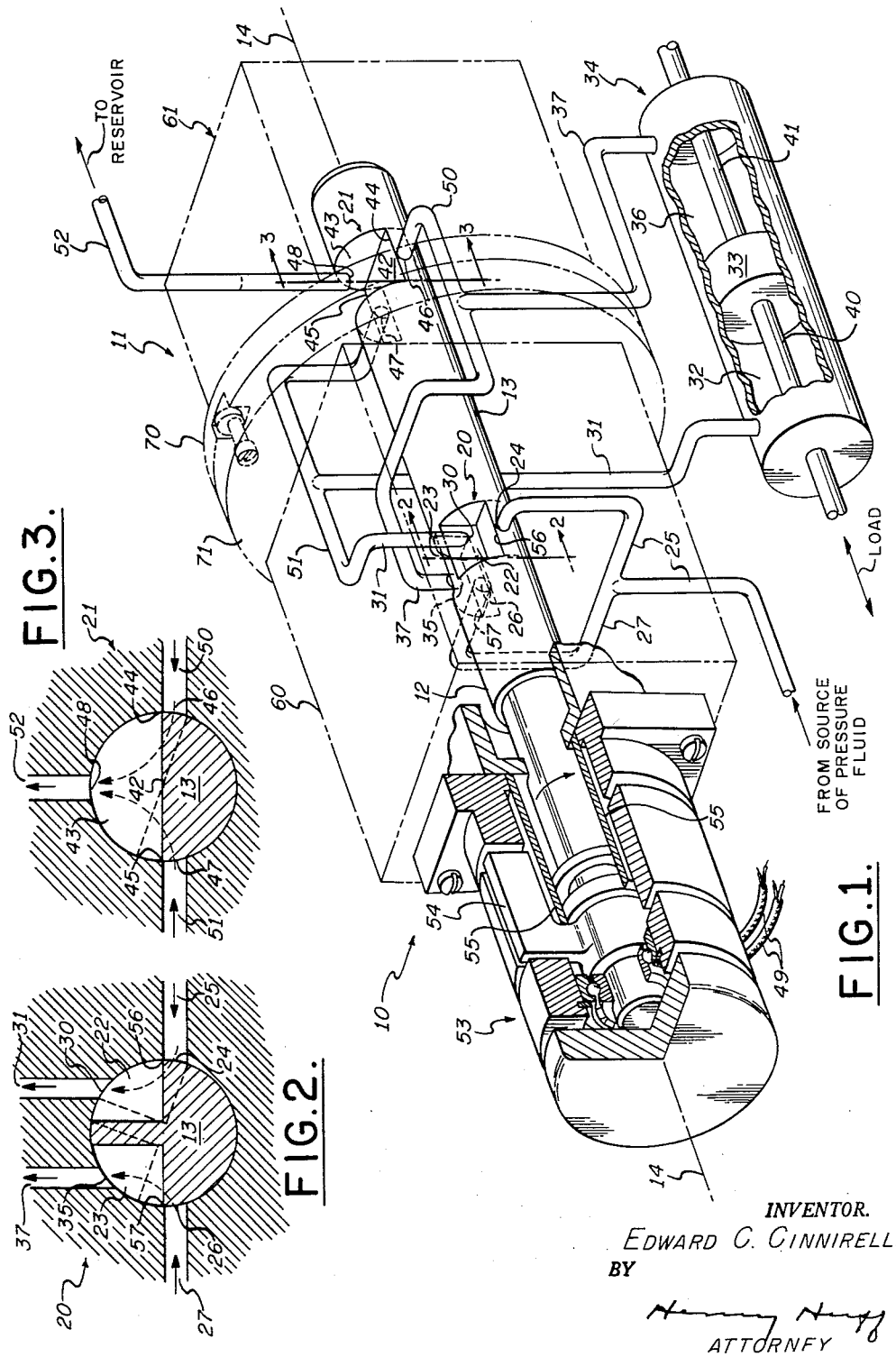

Filed Dec. 12, 1960 2 Sheets-Sheet 2

INVENTOR.
EDWARD C. CINNIRELLA
BY
ATTORNEY

# United States Patent Office 3,023,779
Patented Mar. 6, 1962

3,023,779
FLUID FLOW CONTROL VALVE
Edward C. Cinnirella, Brooklyn, N.Y., assignor to Sperry Rand Corporation, Great Neck, N.Y., a corporation of Delaware
Filed Dec. 12, 1960, Ser. No. 75,228
5 Claims. (Cl. 137—623)

This invention relates generally to fluid flow control or servo valves usually used for controlling the flow of fluid in a hydraulic control system.

Servo valves of this type are generally electrohydraulic devices which receive electrical input signals from signal generating devices and control the flow of pressure fluid to an actuator or member in accordance with the control signal. Typical conventional servo valves are described in an article entitled "What to Look for in Electrohydraulic Servo Valves" by B. A. Johnson et al., published in the June 1956 issue of Control Engineering on pages 84–95. In a conventional servo valve of this type, the control signal energizes a torque motor whose armature displaces a flapper from a normal position between two fluid discharge nozzles which are connected to respective chambers to create a differential pressure between the chambers proportional to the control signal. This differential pressure acting on the ends of a valve spool positions the valve spool to control the direction and extent of pressure fluid flow to an actuator or member.

In order for the conventional servo valve to operate with stability and to avoid chattering, it is necessary to reduce the supply pressure of the fluid to a fraction of its original pressure, thus wasting potential power. Further, flapper type servo valves are very susceptible to clogging due to dirt, chips, etc. in the fluid. Another disadvantage of a flapper type valve is that there must always be a loss of power due to pressure fluid impinging upon the flapper even in the null condition. Further the machining tolerances which must be maintained in a flapper type servo valve are extremely critical and require close matching of the spool stage with the flapper stage to provide optimum performance. Thus, the conventional flapper type servo valve is quite complex, relatively difficult to manufacture, and susceptible of instability and clogging.

It is a primary object of the present invention to provide a fluid flow control valve having a minimum number of stages between the pressure fluid supply source and the actuator or member.

It is another object of the present invention to provide a servo valve which permits utilization of a higher proportion of the potential fluid horsepower.

It is an additional object of the present invention to provide a servo valve having improved fluid flow characteristics that is compact, reliable and relatively inexpensive to manufacture.

These and other objects are provided by the fluid flow control valve of the present invention which has a common valve armature shaft having first and second spaced fluid flow control means integral with said shaft. The first flow control means controls flow to the actuator while the second flow control means controls flow from the actuator. The armature of the torque motor which positions the shaft is also integral therewith.

The present invention thus eliminates the aforementioned disadvantages of the conventional flapper type servo valve while providing the following advantages:

(1) By providing only one stage between the fluid pressure supply and the actuator mechanism, the maximum potential fluid horsepower is utilized to position the actuator.

(2) Because of the shearing action of the metering edges of the present valve, it is relatively impervious to clogging due to dirt, chips, etc.

(3) The flow control portions of the present valve can be varied to have zero-lap, under-lap, or over-lap and the inlet and outlet orifice dimensions can be varied to match a desired load condition.

(4) The dynamic response of the present valve is much higher as a result of the single stage operation and the reduction in the necessary manifolding.

(5) The hydraulic forces applied to the control valve can be readily compensated in order that the torque required to rotate the shaft under full load conditions is extremely low.

(6) Due to the unitary shaft design, the valve can withstand extremely high impact and "g" loads and it is relatively insensitive to vibrations, and (7) It is relatively simple to construct since it has only four critical metering edges and the two section valve housing is adjustable.

Referring now to the drawings,

FIG. 1 is a schematic perspective view, partially in phantom, of the servo valve of the present invention;

FIG. 2 is a sectional view taken along lines 2—2 of FIG. 1;

FIG. 3 is a sectional view taken along lines 3—3 of FIG. 1;

Figure 4:
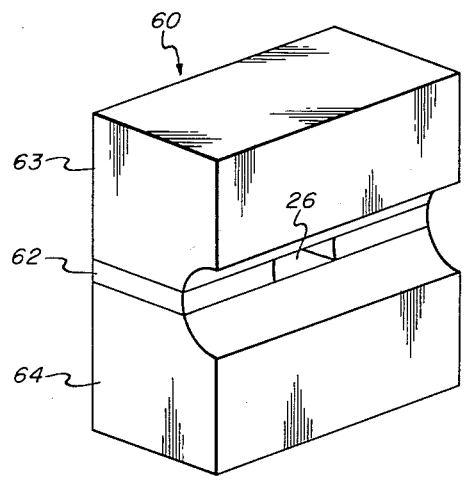
FIG. 4 is a sectional view taken along lines 4—4 of FIG. 1 omitting the valve shaft.

Referring now to FIG. 1 of the drawings, the invention will be described for purposes of example with respect to an electrohydraulic servo flow control valve 10. The servo valve 10 comprises a valve housing or body portion 11 having a longitudinal bore 12 therein adapted to rotatably receive a cylindrical control valve shaft 13. The valve shaft 13 has a longitudinal axis 14 which is disposed coincident with the longitudinal axis of the bore 12.

The portion of the shaft 13 within the housing 11 has axially-spaced first and second fluid flow control means 20 and 21 respectively, disposed integrally with the shaft 13. The first fluid flow control means 20 includes first and second circumferentially-spaced axial grooves 22 and 23 respectively. The groove 22 is cooperative with a supply port 24 which is connected to a source of pressure fluid, indicated by the legend, by means of a conduit 25. In a similar manner, a supply port 26 cooperates with the groove 23 and communicates by means of a conduit 27 to the source of pressure fluid. Also cooperative with the groove 22 is a control port 30 which communicates by means of a control conduit 31 to a chamber 32 on one side of a piston 33 of a hydraulic actuator 34. In a similar manner, a control port 35 which is cooperative with the groove 23 communicates with a chamber 36 on the other side of the piston 33 by means of a control conduit 37. The actuator 34 includes piston rods 40 and 41 which are connected to the piston 33 and extend exteriorly of the actuator 34 from opposite sides of the piston 33. Either or both of the piston rods 40 and 41 may be connected to drive a load in a conventional manner.

The second fluid flow control means 21 includes a flat 42 axially disposed integral with the valve shaft 13. The cutout prortion of the valve shaft 13 formed by the flat 42 cooperates with the valve housing 11 adjacent thereto to form a fluid-receiving chamber 43. The flat 42 has first and second metering edges 44 and 45 which are cooperative with first and second rectangularly-shaped control ports 46 and 47, respectively. The chamber 43 is also cooperative with an exhaust port 48. The control port 46 is connected by means of a conduit 50 and the conduit 37 to the chamber 36 while the control port 47 is connected by means of a conduit 51 and the conduit 31 to the chamber 32. The exhaust port 48 is connected by means of a conduit 52 to a fluid reservoir or sump as indicated by the legend.

In the embodiment of FIG. 1, the valve shaft 13 is rotated by means of a torque motor 53 in response to electrical control signals received on leads 49. The torque motor 53 is mounted on the housing 11 and may be of the type shown in U.S. patent application S.N. 20,119, entitled Fluid Flow Control Valve of L. J. Reitman filed April 5, 1960. The armature 54 of the torque motor is integral with the portion of the control valve shaft 13 which extends exteriorly of the housing 11. The armature 54 on the shaft 13 may be so mounted as to be pivotally supported and spring centered around its axis 14 by a resilient torsion tube 55. The torsion tube 55 may act as a resilient member and also as a hydraulic seal as shown for example in the aforementioned patent application S.N. 20,119.

In operation, as shown more clearly in FIG. 2, in the closed or null position of the servo valve 10, the shaft 13 is so disposed that the metering edges 56 and 57 of the grooves 22 and 23 close the supply ports 24 and 26, respectively. As shown more clearly in FIG. 3, in this position the metering edges 44 and 45 also close the ports 46 and 47, respectively. With the servo valve in the null condition, high pressure fluid from the pressure fluid source is applied through conduits 25 and 27 to the supply ports 24 and 26, respectively, but is prevented from going further by that portion of the valve shaft 13 adjacent the ports 24 and 26. Similarly, the escape of fluid from the chambers 32 and 36 is blocked by that portion of the valve shaft 13 adjacent the control ports 46 and 47.

With the armature 54 integral with the shaft 13, when a control signal is applied to the torque motor 53, the shaft 13 is rotated against the torsional stress of the torsion tube 55 in a particular direction and through an arc in accordance with the polarity and magnitude respectively of the control signal until the force applied by the torque motor 53 balances the force applied by the torsion tube 55. Assuming a control signal which causes clockwise rotation of the valve shaft 13, in a direction indicated by the arrow in FIG. 1, the control port 24, as shown in dotted lines in FIG. 2, is then no longer blocked by that portion of the valve shaft 13 which was adjacent to it and pressure fluid flows through conduit 25, supply port 24, port 30, and conduit 31 to the chamber 32 of the actuator 34. The high pressure fluid supplied to the chamber 32 applies a force to the piston 33 driving the load to the right as viewed in the drawing.

Simultaneously, the control port 46, as shown in dotted lines in FIG. 3, is also open and fluid from the chamber 36 is permitted to flow through the conduits 37 and 50, the control port 46 and into the chamber 43, thence through the exhaust port 48 and the conduit 52 to the reservoir. When the control signal goes to zero, the resilient centering force applied by the torsion tube 55 returns the shaft 13 to its null or centered condition.

In a similar manner counterclockwise rotation of the valve shaft 13 permits pressure fluid to be supplied to the chamber 36 while fluid from the chamber 32 is exhausted to the reservoir thereby driving the piston 33 of the actuator 34 to the left as viewed in the drawing.

For ease of manufacturing and assembly as well as for purposes of compactness, the servo valve 10 may be constructed as follows. The housing 11 may be formed of two sections 60 and 61 and each of the sections 60 and 61 of the housing 11 may consist of a number of laminations. As shown more clearly in FIG. 4, for example, a rectangularly-shaped supply port 26 may be conveniently constructed by laminating a thin flat piece of metal 62 between an upper block of metal 32 and a lower block of metal 64, the height of the supply port 26 being equal to the thickness of the lamination strip 62. In a similar manner, the sections 60 and 61 may be further laminated to provide for all of the supply, control and exhaust ports therein.

Figure 5:
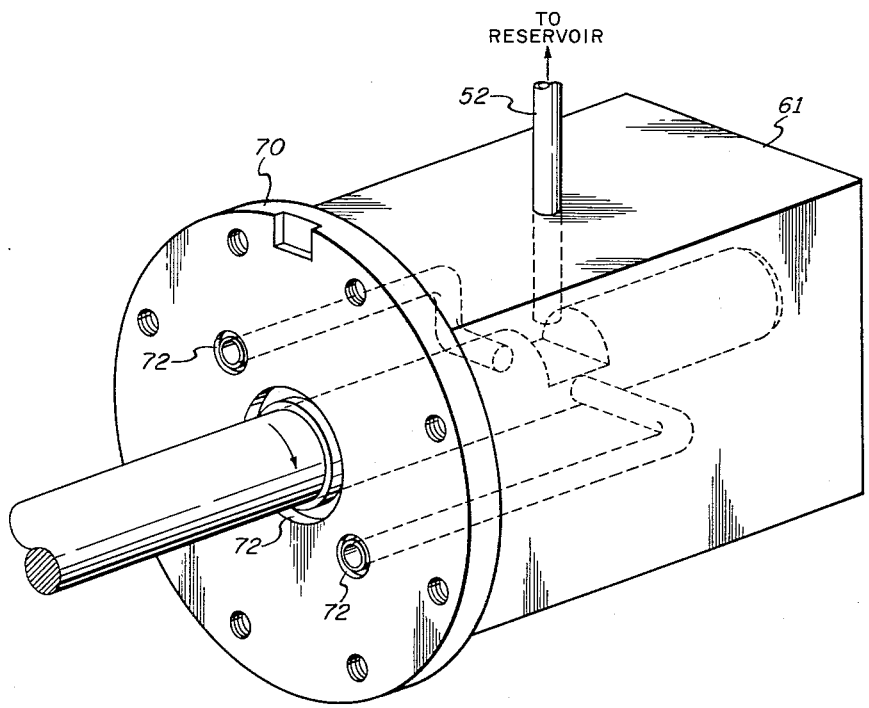
FIG. 5 is a sectional view taken along lines 5—5 of FIG. 1.

Further, section 61 may be arranged to be adjustable around the axis 14 with respect to section 60 in order that the flow characteristics of the second fluid flow control means 21 may be matched to those of the first fluid flow control means 20. By this arrangement, the machining tolerances of the first and second fluid flow control means need not be as precise as would otherwise be required if the metering edges of the first and second fluid flow control means 20 and 21 had to be precisely machined to match their respective supply, control and exhaust ports. A convenient method of accomplishing this may be seen more clearly with respect to section 61 of the valve housing 11 as shown in FIG. 5. Section 61 has a bolting flange 70 attached thereto which cooperates with a similar bolting flange 71 (shown in FIG. 1) on section 60. By this arrangement section 61 can be rotated around the axis 14 until the flow characteristics of the second fluid flow control means 21 is matched to those of the first fluid flow control means 20 without requiring precise machining of the second fluid flow control means 21. Conventional O ring seals 72 disposed between the sections 60 and 61 prevent leakage of the pressure fluid. For purposes of simplicity, other seals which may be required to prevent leakage of the hydraulic fluid have not been shown although they may be applied in a conventional manner.

Although the force required to rotate the valve shaft 13 is relatively low, in certain applications where it is desired to provide an extremely compact servo valve 10 or where the control signal may be relatively weak, it may be desirable to minimize the torque required to rotate the valve shaft 13 by compensating for the unbalanced hydraulic forces applied thereto. This may be accomplished by manifolding the necessary pressure fluid to exposed areas of the shaft 13 to thereby minimize any unbalanced hydraulic forces.

Although the servo valve of the present invention has been described as being driven by an electric torque motor, it will be appreciated that the shaft 13 may be positioned either in rotation or in translation by any other type of positioning means by simple design changes that would be obvious to those skilled in the art.

It will be appreciated that the present invention permits the maximum potential fluid horsepower to be utilized since it eliminates the flapper and spool stages of conventional flapper type servo valves. Further, during operation, the metering edges on the valve shaft tend to shear any metal chips or dirt and thus substantially eliminates the problem of clogging which is common to conventional flapper type servo valves.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A fluid flow control valve for controlling fluid flow to and from a member comprising a fluid input adapted for connection to a source of fluid under pressure, fluid conduit means communicating with said member, a fluid output adapted for connection to a fluid reservoir, a valve shaft, first and second spaced flow control means integral with said shaft, said first flow control means comprising a pair of spaced axial grooves cooperable with said fluid input and said conduit means for controlling the flow of pressure fluid to said member in accordance with the position of said valve shaft, said second flow control means comprising a flat on said valve shaft being cooperable with said conduit means and said fluid output for controlling the flow of pressure fluid from said member in accordance with the position of said valve shaft, said first and second flow control means being so disposed and arranged as to be synchronized with respect to each other, signal generating means for providing a control signal, and means responsive to said control signal for positioning said valve shaft to control the flow of fluid to and from said member in accordance with said control signal.

2. A servo control valve for controlling fluid flow to and from a member comprising a valve housing having a bore and pressure fluid supply, control and exhaust ports therein, first conduit means adapted to connect said supply ports to a source of pressure fluid, second conduit means for communicating with said control ports and said member, third conduit means adapted to be connected to a fluid reservoir, a cylindrical valve shaft having a longitudinal axis concentric with the longitudinal axis of said bore, the diameter of said valve shaft being very slightly smaller than the diameter of said bore, said shaft having first and second spaced flow control means disposed integral therewith and within said housing, said first flow control means being cooperable with said supply ports and a portion of said control ports for controlling the flow of pressure fluid to said member in accordance with the position of said valve shaft, said second flow control means being cooperable with another portion of said control ports and said exhaust port for controlling the flow of pressure fluid from said member in accordance with the position of said valve shaft, said first and second flow control means being cooperable with respect to each other, and means for positioning said valve shaft for controlling the flow of fluid to and from said member.

3. A valve of the character described in claim 2 wherein said valve housing comprises a plurality of laminated elements and at least one pair of said fluid ports is so constructed and arranged by means of said laminations to form rectangular ports.

4. A valve of the character described in claim 2 wherein said valve housing comprises first and second sections rotatable with respect to each other around the longitudinal axis of said bore, the first section of which includes the supply and control conduits cooperable with said first flow control means and the second portion of which includes the control and exhaust ports cooperable with said second control means whereby the first and second sections are movable with respect to each other for matching the flow characteristics of said first and second flow control means.

5. A valve of the character described in claim 2 wherein said means for positioning said valve shaft includes a torque motor responsive to a control signal, the armature of said motor being integral with said valve shaft, said armature being axially spaced with respect to said first and second flow control means.

References Cited in the file of this patent
UNITED STATES PATENTS

| | | |
|---|---|---|
| 2,520,266 | Adams | Aug. 29, 1950 |
| 2,642,885 | Wade | June 23, 1953 |
| 2,945,480 | Toman | July 19, 1960 |